Oct. 23, 1951     H. N. BLISS ET AL     2,572,241
RECORDER FOR COLLECTIONS
Filed Feb. 7, 1947     3 Sheets—Sheet 2
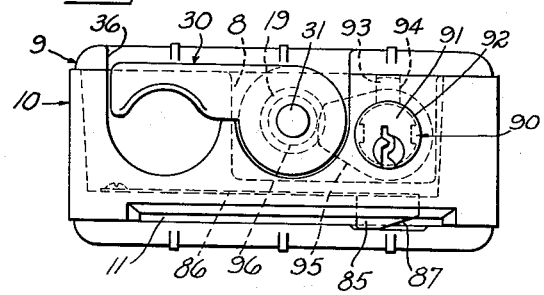
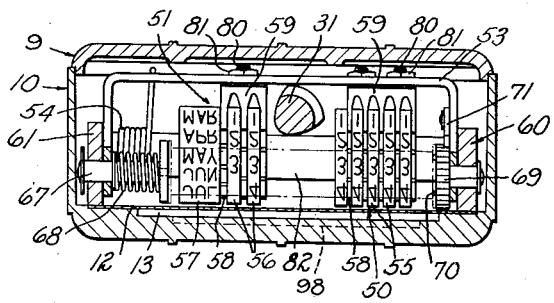
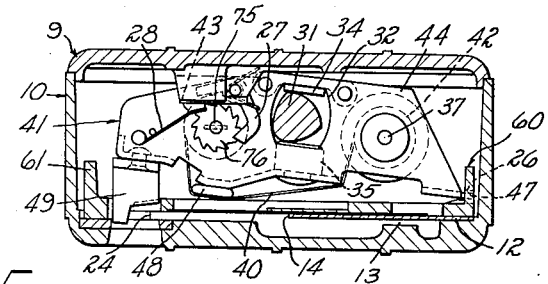
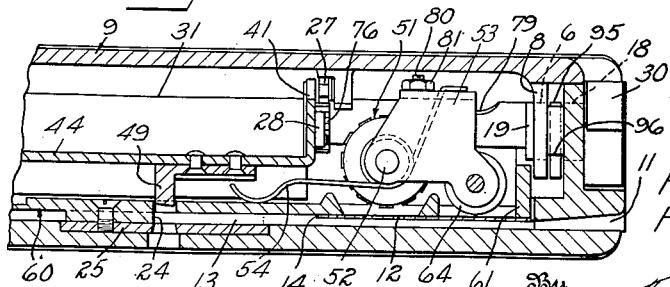
Inventors
HARVEY N. BLISS
HAROLD B. VROOM
By Clay Lindsey
Attorney Oct. 23, 1951  H. N. BLISS ET AL  2,572,241
RECORDER FOR COLLECTIONS
Filed Feb. 7, 1947  3 Sheets-Sheet 3
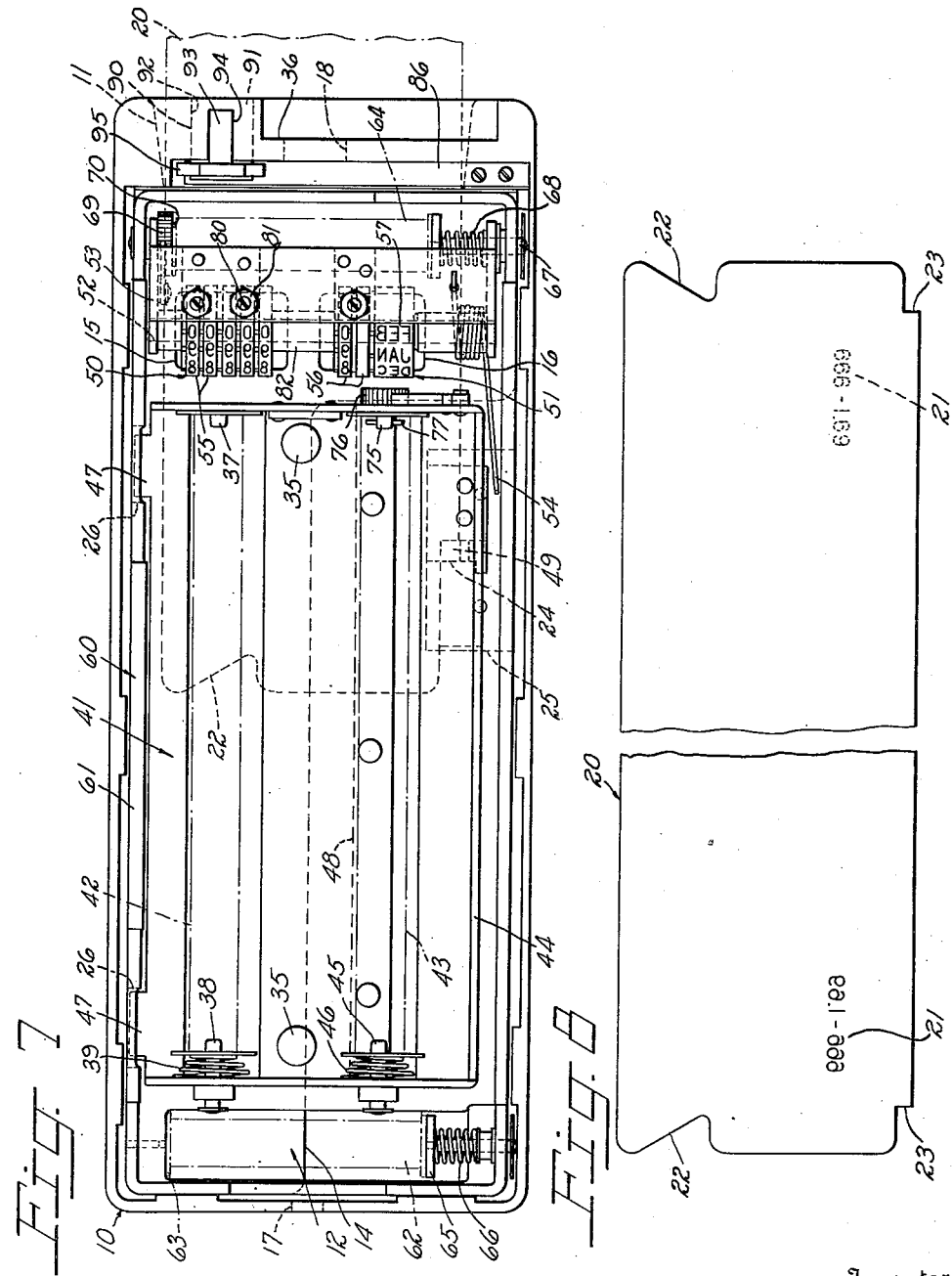
Inventors
HARVEY N. BLISS
HAROLD B. VROOM
By  C. Clay Lindsey
Attorney Patented Oct. 23, 1951

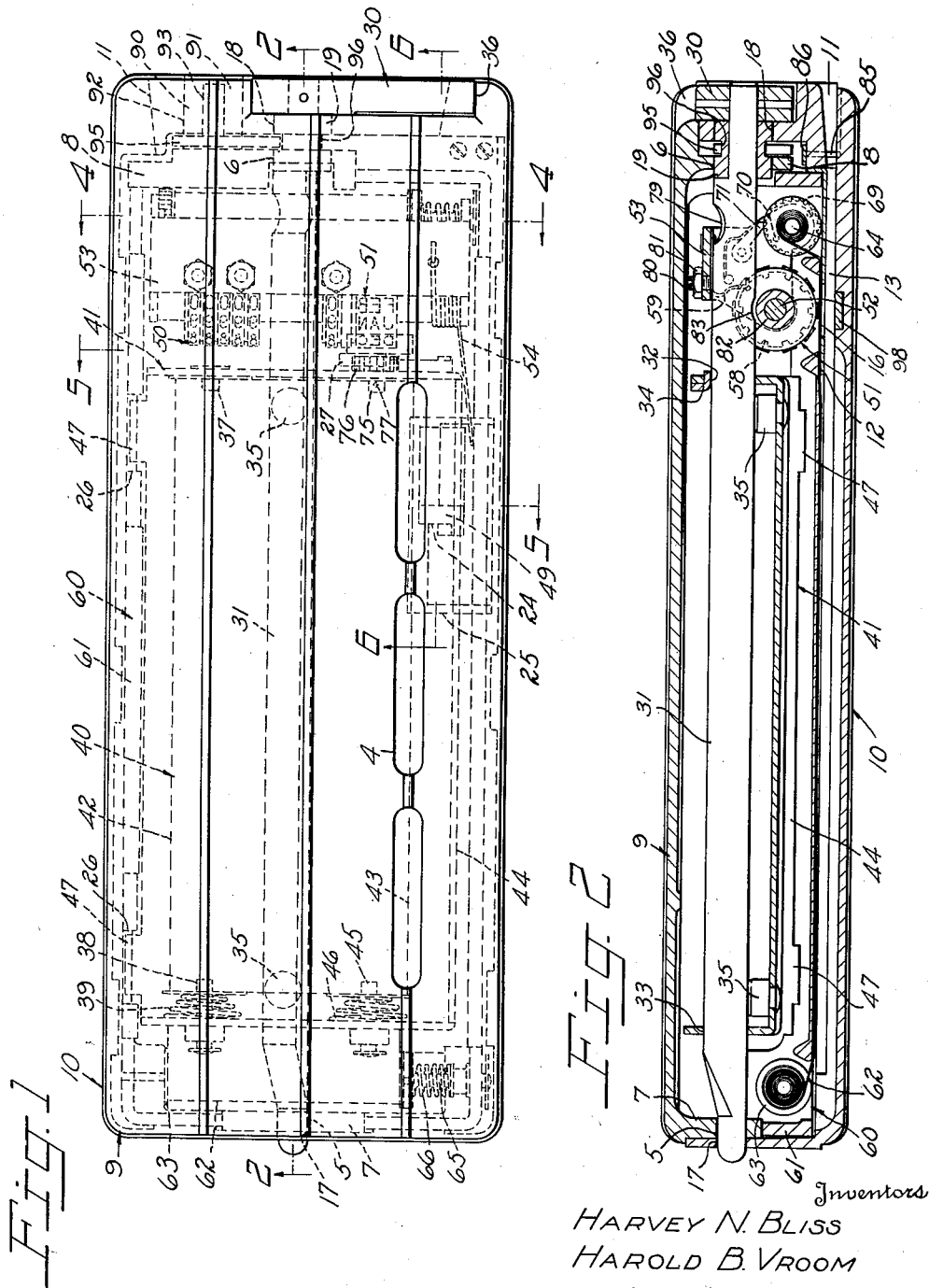

2,572,241

UNITED STATES PATENT OFFICE 2,572,241

RECORDER FOR COLLECTIONS

Harvey N. Bliss, Windsor, and Harold B. Vroom, Hartford, Conn., assignors to Veeder-Root Incorporated, Hartford, Conn., a corporation of Connecticut Application February 7, 1947, Serial No. 727,268

9 Claims. (Cl. 101—96)

The present invention relates to recorders, and more particularly to recorders for collections of the type which are operable for simultaneously printing an office record and a customer's record of collections made.

The present invention relates particularly to the type of recorder for collections shown in the patent to Bliss, No. 2,346,145, issued April 11, 1944, which recorder is a relatively small and compact portable instrument into which is adapted to be inserted a customer's receipt card and which is operable for printing a record of a collection on this receipt card and simultaneously recording the collection on a tally roll for office use. This type of recorder of collections is particularly adapted for use by collectors of fixed sums at periodic intervals such as collectors of insurance premiums paid on a weekly or monthly basis.

It is an object of the present invention to provide a portable recording instrument of the character described which is compact and of relatively light weight so that it may be conveniently carried by a collector and whereby its use is facilitated.

It is another object of the present invention to provide a recorder of the character described which is of simple design and which may be easily assembled and disassembled both in the original assembly of the device and also in the event that it is necessary to repair or replace any of the parts. In connection with this object, it is an aim of the invention to provide a recorder which may be locked in a closed condition, but which, when unlocked, is adapted to be easily opened for the removal of the office record printed therein, as well as for changing the setting of the printing mechanism as desired and for substituting a fresh tally roll or inking ribbon. In connection with this object, it is an aim of the invention to provide a recorder for collections wherein all of the sub-assemblies utilized therein are interconnected by means of a single operating cam shaft, thereby avoiding the need for supplementary fastening means such as bolts, rivets and the like, and permitting the disassembly of the recorder merely by removal of the shaft.

It is a further object of the invention to provide a recorder for collections in which the parts are made from easily fabricated stampings and die castings so that the cost of the instrument may be kept at a minimum without at the same time sacrificing any of the advantages of the instrument such as its efficiency, ruggedness and dependability.

A further object of the invention is to provide a recorder of collections which is so designed that the operating pressures which result during use of the device are absorbed by a solid one-piece casing thereby avoiding the necessity for heavy connecting members between the cover and the casing which would be required if operating pressures of any magnitude were exerted against the cover and which would normally interfere with and create difficulties in the removal of the cover from the casing.

Another object of the invention is to provide an improved printing mechanism whereby the printing of a record of a collection on the customer's receipt card and at the same time the printing of a record thereof on a tally card for office use is accomplished with a minimum of effort, with effective results and without likelihood of malfunctioning so that an accurate and reliable double recording as described is assured.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings—

Figure 1 is a plan view of a recorder for collections constructed in accordance with the invention;

Fig. 2 is a cross sectional view taken along the line 2—2 of Fig. 1;

Fig. 3 is an end view of the recorder shown in Fig. 1;

Fig. 4 is a cross sectional view taken along the line 4—4 of Fig. 1;

Fig. 5 is a cross sectional view taken along the line 5—5 of Fig. 1;

Fig. 6 is a cross sectional view taken along the line 6—6 of Fig. 1;

Fig. 7 is a plan view of the recorder for collections with the cover removed and with the tally roll and customer's receipt card shown in dash lines; and Fig. 8 is a plan view of a customer's receipt card which is adapted to be used with the recorder for collections.

Referring to the drawings, the recorder is contained within a generally rectangular, box-like casing 10 having a slot 11 at one end through which is adapted to be inserted the customer's receipt card 20 of the type, for example, shown more particularly in Fig. 8. The recorder is constructed, as will be described more particularly hereinafter, so that when the receipt card 20 is inserted through the slot 11 and the operating handle 30 is turned through an angle of 90°, there is printed transversely on the card 20 the date of the collection and an identifying mark which, in the specific example given, is a number for identifying the person making the collection. At the same time, the amount of the collection and the number of the customer's account is printed transversely on a tally roll 40 contained within the casing 10 from embossed indicia 21 on the card 20.

In assembling the recording instrument of the present invention, there is first placed in the casing 10 a ribbon guard 12 which is in the form of a flat plate and which rests on the edges of the bottom of the casing 10. The bottom of the casing 10, however, is provided with a longitudinal depression 13 corresponding to the slot 11 so that the customer's receipt card 20 may be inserted into the casing 10 beneath the ribbon guard 12. The ribbon guard 12 has a cut-out portion 14 to permit printing on the tally roll 40 from the raised, i. e., embossed, indicia 21 on the receipt card 20, as more particularly described hereinafter. The ribbon guard 12 also has two openings 15 and 16 which permit the printing of a record on the receipt card 20 from printing roll assemblies 50 and 51 also to be described more particularly hereinafter.

After the ribbon guard 12 is inserted within the casing 10, there is placed thereon a ribbon group assembly generally denoted by the reference numeral 60 which comprises a tray-like frame member 61 on which is mounted an inking ribbon 62 and the printing roll assemblies 50 and 51. The inking ribbon 62 is carried by spools 63 and 64 in the usual manner, which spools are respectively mounted at either end of the frame member 61. The spool 63 is journaled at one end in the frame 61 and at the other end in a longitudinally movable pivot post 65 which is urged inwardly toward the spool by spring 66. The spool 64 is similarly journaled at one end in a pivot post 67 urged inwardly by a spring 68 while the opposite end is journaled in a ratchet wheel 69 rotatably mounted on the frame 61 and to be described more particularly hereinafter. A plurality of pins 70 receivable in corresponding holes in the spool 64 are utilized to form a driving connection between ratchet wheel 69 and spool 64 whereby, as will be apparent, it is possible to wind the ribbon by rotating the ratchet wheel 69. The spools 63 and 64 may readily be inserted by moving the pivot posts 65 and 67 outwardly against the springs 66 and 68, respectively, following which the posts 65 and 67 are released to engage the spools 63 and 64 and hold them in the position shown. The inking ribbon 62 extends under the bottom of the frame member 61, which is to say, across the top of the ribbon guard 12.

Also mounted on the frame member 61, as heretofore mentioned, are the printing wheel assemblies 50 and 51 which include a shaft 52 carried by a frame 53 which frame is pivotally mounted on the frame member 61 at the axis of the spool 64. The frame 53 is urged upwardly, i. e., pivoted, away from the inking ribbon 62 by the spring 54.

In the specific embodiment shown, the printing wheel assembly 50 comprises a series of side by side number wheels 55 which are adapted to be manually set to any number from "0" to "99999" to identify the particular collector utilizing the instrument. The printing wheel assembly 51 comprises two side by side number wheels 56 and a wheel 57 containing abbreviations of the months of the year, these wheels being manually settable to provide the date on which the instrument is being utilized, i. e., the date of the collection. Each of the printing wheels 55, 56 and 57 is formed with or joined to a ratchet wheel 58 which ratchet wheels are releasably held in desired rotated position by engagement with multi-fingered resilient detents 59 depending downwardly from the frame 53. Set screws 80 and lock nuts 81 are provided for adjusting the detents 59 so that they engage the ratchet wheels 58 at a proper rotated position for accurate printing. As will be apparent, each of the wheels 55, 56 and 57 can be manually turned in either direction to align the proper indicia at the bottom of the wheels where the printing action takes place and the wheels are retained in this selected position by the detents 59.

Above the ribbon group assembly 60 there is a tally roll group assembly, generally denoted by the reference numeral 41, comprising a frame 44 on which is mounted the tally roll 40 previously referred to. The tally roll 40 is mounted on a plurality of rollers 42 and 43 which extend longitudinally along either side of the frame 44. The roller 42, which is axially recessed at either end, is positioned by a fixed pin 37 at one end and a longitudinally slidable pivot post 38 at the other end urged inwardly into engagement therewith by a spring 39. The roller 43, which is similar to roller 42, is supported at one end by a similar longitudinal pivot post 45 urged inwardly by the spring 46 and at the other end by a shaft 75 to which is fixed a ratchet wheel 76. A transverse pin 77 in the shaft 75 is adapted to engage in a groove in the end of the roller 43 whereby the roller is keyed to the shaft and thus may be turned by turning the ratchet wheel 76. As will be apparent, the rolls 42 and 43 may be readily inserted into position on the frame 44 by pressing the posts 38 and 45 outwardly until the rolls are properly placed, whereupon the posts 38 and 45 are released causing them to engage the rollers 42 and 43.

The frame 44 of the tally roll assembly 41 is provided with lugs 47 which are adapted to be received in slots 26 in the frame member 61 and to pivot thereon. The pivoted position of the tally roll assembly 41 is determined by a cam shaft 31 to which the operating handle 30 is secured, which cam shaft is journaled at either end in the casing 10 and extends through openings 32 and 33 in the frame 44. The opening 32, for example, is provided with an upper wear plate 34 and both openings 32 and 33 being provided therebeneath by wear plugs 35 against which the cam shaft 31 is adapted to bear. The cam shaft 31 is so formed in cross section that, when it is turned in clockwise direction (as viewed in Figs. 3–5) through an angle of 90°, it bears against plugs 35 to cause the tally roll assembly 41 to pivot in a counterclockwise direction and, when the operating handle 30 is pivoted back to the original position shown in Fig. 3, it bears against the top of openings 32 and 33 to cause the tally roll assembly 41 to be returned in a clockwise direction to its original position shown in Fig. 5.

The cam shaft 31 is of reduced circular cross section at either end where it is journaled in openings 17 and 18 at the ends of the casing 10. The opening 18 is made of sufficient diameter so that it will clear the intermediate camming portion of the shaft 31 whereby the shaft may be slid into operating position through the opening 18 when the device is assembled. A collar 19 on the shaft 31 is utilized to provide a close fit with the opening 18 when shaft 31 is in place. A notch 79 is provided to insure that the shaft 31 will clear the inking ribbon spool 64 when the shaft is turned.

The shaft 31 also extends through openings 5 and 6 formed respectively in downwardly depending lugs 7 and 8 of the cover member 9. The cover member 9 is constructed to closely fit on the top of the casing 10 and to be held tightly thereon by engagement of the lugs 7 and 8 with the shaft 31. Windows 4 are provided so that the operator may view the tally roll 40 to be sure that the device is functioning properly.

The operating handle 30 is received in a recess 36 formed in the end of the casing 10 which recess has the function of limiting turning of the handle through an angle of 90° and of protecting the handle and mechanism actuated thereby from accidental operation or damage.

When the recorder is assembled, the cam shaft 31 extends between the top of the frame 53 and the printing wheel assemblies 50 and 51, resting upon a collar 82 on the shaft 52 which spaces the printing wheels 55 from printing wheels 56 and 57. Accordingly, as the cam shaft 31 is turned by the operating handle 30 to pivot the tally roll assembly 41 downwardly, there is also produced a downward thrust on the printing rollers 50 and 51 causing the frame 53 to pivot downwardly on the frame member 61. The notch 83 in the cam shaft 31 is provided merely to increase the permissible upward pivoting movement of the frame 53 when the shaft 31 is turned to its original position.

The parts are adapted to be locked in assembled position by means of a lock assembly 90 which comprises a conventional lock barrel 91 received in a bore 92 in the casing 10 and having a lug 93 received in a groove 94 cut longitudinally in the top of the bore 92. The barrel 91 has secured thereto a locking arm 95 the end of which is adapted to be received in an annular groove 96 formed in the collar 19 of the shaft 31. The locking position is shown in Fig. 3 with the locking arm 95 received in the groove 96, thereby preventing withdrawal of the shaft 31. When the proper key (not shown) is inserted in the barrel 91 and the locking arm 95 is turned thereby so as to free it from the groove 96, the shaft 31 may be pulled out by grasping the operating handle 30, which immediately releases all of the various assemblies described above and including the cover 9. Accordingly, it is a simple procedure to disassemble the recorder for adjustment or replacement of parts as well as for the more frequent purpose of changing the tally roll or inking ribbon as well as for resetting the printing roll assemblies.

Assuming that the recorder is assembled as previously described and it is desired to record a collection therewith, the receipt card 20 is inserted into the slot 11. Normally situated in the path of a receipt card 20 inserted through the slot 11, however, is a lug 85 mounted on the free end of a flexible arm 86 which is secured at the other end to the casing 10. In the embodiment shown, the blocking member or lug 85 is formed of a flat piece of metal having a lower edge which is inclined upwardly on one side as at 87. The inclined edge 87 is adapted to cooperate with a rearwardly extending camming edge 22 formed by cutting a notch adjacent one side of each of the leading edges of the receipt card 20. When the card is properly inserted, the edge 22 engages the inclined edge 87 of lug 85 whereby the lug 85 is cammed out of obstructing position when the card 20 is properly inserted. If the card were attempted to be improperly inserted, or if a card not having a rearwardly inclined camming edge were attempted to be inserted, the leading transverse edge of the card would merely abut against the lug 85 without camming it out of blocking position, thus preventing insertion of the card. The receipt card 20 is adapted to be used on both sides for the sake of economy and, therefore, it is provided on both sides with raised indicia 21 in the form of embossings which are suitable for printing purposes. In the specific embodiment shown, this indicia comprises a first number identifying the customer's account and a second number stating the amount of the periodic payment in dollars which the customer is obligated to make. These raised indicia 21 are intended to print against the tally roll 40 where the tally roll 40 extends underneath a platen 48 secured to the frame 44 and, therefore, the indicia 21 are located adjacent the leading edges of the receipt card 20 and, in the specific embodiment shown, slightly to one side of the longitudinal center of the card 20. However, since the camming edge 22 is provided on only one corner of the leading edges of the receipt card 20, it is impossible to insert the receipt card 20 into the slot 11 except in the proper position to cause the printing action previously referred to.

The receipt card 20 is formed adjacent each end with a prefixed stop shoulder 23 which is adapted to abut against a boss 24 on the bottom of the frame member 61 thereby fixing the initial longitudinal position to which the receipt card 20 may be inserted through the slot 11 and thus fixing the place at which the printing will occur on the card 20 and tally roll 40 as more fully explained hereinafter.

Mounted on the underside of the tally roll assembly frame 44 is a cutter 49 which cooperates with a die block 25 mounted on the boss 24. The operation of the cutter 49 and die block 25 is to cut a piece of predetermined size from the stop shoulder 23 every time a record is made, i. e., every time the frame 44 is pivoted by the shaft 31, so that, when the card is reinserted in the recorder for recording a subsequent transaction, the card will enter the slot 11 a greater predetermined amount thereby causing consecutive recordings to be made at a different place on the receipt card 20 and on the tally roll 40 in sequence.

The form of the card 20 and the cooperating control means positioned in the slot 11 for insuring that the card is properly inserted into the recorder is disclosed and claimed in the co-pending application of Harvey N. Bliss, Serial No. 188,978, filed October 7, 1950.

Assuming that the printing rollers 50 and 51 are set to print the identifying number of the collector and the date on which the collection takes place and the record card 20 is properly inserted, the operating handle 30 is turned clockwise, as viewed in Fig. 3, through an angle of 90° thereby causing the tally roll assembly 41 and the printing wheel assemblies 50 and 51 to be pivoted downwardly as previously described. This causes the printing wheel assemblies 50 and 51 to press against the inking ribbon 62 and the receipt card 20 through the openings 15 and 16 in the ribbon guard 12 thereby making a lateral record on the receipt card 20 of the date and the number of the collector making the collection. A resilient pressure pad 98 may be utilized as an insert in the bottom of the casing 10 to act as a platen beneath the printing wheel assemblies 50 and 51. At the same time, the raised indicia or embossings 21 are caused to press against the tally roll 40 and the inking ribbon 62 by means of the downward pressure of the platen 48, this being permitted by the cut-out portion 14 of the ribbon guard 12. This causes a record to be made on the tally roll of the identifying number of the customer and the amount of the collection, as previously mentioned. At the same time, a cut is made on the stop shoulder 23 of the receipt card 20. The operating handle 30 is then returned to its original position, as shown in Fig. 3, which causes the tally roll assembly 41 and the printing rollers 50 and 51 to pivot upwardly to their original positions.

Immediately upon this return pivoting movement of the tally roll assembly 41, the ratchet wheel 76, which is effective for winding the tally roll 40 as previously described, is rotated in a clockwise direction (as viewed in Fig. 5) by engagement with a spring pressed pawl 27 extending downwardly from the cover 9. This causes the tally roll 40 to be advanced a sufficient distance so that, when a subsequent collection is made, the next recording follows after and spaced laterally from the recording of the previous collection. Such advancement of the tally roll 40 after each collection, of course, continues until the tally roll is entirely used up. To prevent turning of the ratchet wheel 76 in reverse to that described above, i. e., counterclockwise, there is provided a detent 28 in the form of a light spring, the free end of which rides over the teeth of the ratchet wheel 76 during clockwise rotation thereof but which engages therein and locks the wheel against turning in a counterclockwise direction. The pawl 27, being pivotally mounted on the cover 9, will be cammed outwardly and slide over the ratchet wheel during downward pivoting movement of the tally roll assembly 41 without causing any turning thereof.

As previously described, the inking ribbon spool 64 is mounted on and adapted to be turned by a ratchet wheel 69. A spring pressed pawl 71 pivotally mounted on the frame 53 which carries the printing rollers 50 and 51 engages the ratchet wheel 69 and is arranged to turn the wheel a slight amount following each recording so as to present a fresh surface of the inking ribbon for subsequent recordings. When the frame 53 and printing rollers 50 and 51 are pivoted downwardly during the recording operation, the detent slides over the ratchet wheel 69 without turning the same, but on the reverse movement the detent 71 advances the ratchet wheel 69 so as to gradually cause transfer of the inking ribbon 62 from spool 63 to spool 64 in the usual manner.

The operation of the recorder for collections described above will be apparent from the above description taken in connection with the following explanation. It will be observed that each time a collection is made, the receipt card 20 is adapted to be advanced into the recorder one additional space so that a consecutive listing of collections is made on the receipt card whereby the card holder as, for example, an insurance policy holder, has a visual record of each collection made including the date thereof and the number of the collector who made each collection. At the same time, there is printed in consecutive order on the tally roll 40 the number of the customer's account and the amount of the collection made. The spacing of the printing from the side edge of the tally roll 40 indicates the extent to which the customer's receipt card 20 has been inserted into the casing 10 and thus indicates whether the account is in arrears, up to date, or paid in advance. If all collections are up to date, the recordings on the tally roll 40 will, of course, follow in a single column.

The recorder accordingly provides a simple and easy method for satisfactorily recording the work done by the collector and for protecting the policy holder by giving him a proper receipt for all collections made.

Moreover, the device constructed in accordance with the present invention is of such compact design and of such relatively light weight that it can be easily carried by a collector without undue discomfort and without in any way interfering with the ease of making collections.

At the same time, the recorder of the present invention can easily be prepared at the office for proper use by a collector because of the ease with which the device can be disassembled for the purpose of setting the printing rollers 50 and 51 and for inserting new tally rolls 40 or a new inking ribbon 62, if required.

Also, as previously pointed out, the device is constructed of easily manufactured and assembled parts resulting in the production of a precise instrument of accurate functioning at a low cost and, of course, of inexpensive replacement cost in the event that any of the parts become damaged or worn out.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim as our invention:

1. In a recorder for collections adapted to be used with a receipt card having printing indicia embossed thereon, the combination comprising a housing having a receipt card receiving slot adjacent the bottom thereof, a removable tray supported in said housing and spaced above the bottom thereof so as to permit the insertion of the receipt card therebetween, the bottom of the housing being provided with platen means on which the receipt card is adapted to rest, means on the tray for supporting an inking ribbon along the top of the card, a frame means movably supporting the frame above the tray for movement toward and away from the inking ribbon, means on said frame for supporting a tally roll transversely of the receipt card, said frame having platen means for pressing the tally roll against the inking ribbon and raised indicia of the card to cause the roll to be printed upon, a printing mechanism on the tray adapted to be moved toward and away from the inking ribbon, manually operated actuating means supported by said housing for substantially simultaneously moving the frame and printing mechanism against the inking ribbon to cause the tally roll to be printed by the raised indicia of a card inserted beneath the ribbon and to cause the said printing mechanism to print on the card, means for returning the frame and printing mechanism to original position, and means for advancing the tally roll upon return of the frame to original position.

2. A recorder for collections adapted to be used with a receipt card having printing indicia embossed thereon comprising a housing having a receipt card receiving slot adjacent the bottom thereof, a removable tray supported in said housing and spaced from the bottom thereof so that a receipt card inserted through said slot may be received therebetween, means for supporting a plurality of inking ribbon spools on the tray with the inking ribbon extending underneath the tray and across a receipt card inserted into the housing through said slot, a removable frame, means for pivotally supporting the frame above the tray, means on the frame for supporting a tally roll transversely of the receipt card, a platen on said frame adapted to press the tally roll against the inking ribbon and the portion of the receipt card having said embossed indicia when said frame is pivoted downwardly thereby printing a record on the tally roll, a second frame pivotally mounted on the tray, printing elements mounted on the said second frame and adapted to press against the inking ribbon and the receipt card when said second frame is pivoted downwardly thereby printing a record on the receipt card, a cam shaft journaled in said housing and adapted when turned to pivot said first and second frames downwardly to cause said printing action to take place, means for restoring the frames to original position when the camshaft is returned to original position, and a handle external to the casing for turning said shaft.

3. A recorder for collections adapted to be used with a receipt card having printing indicia embossed thereon comprising a box-like housing having a receipt card receiving slot in one end wall adjacent the bottom thereof, a guard plate supported in said housing and spaced from the bottom thereof to permit the insertion of the receipt card therebetween, a removable tray positioned above the guard plate, means on the tray for supporting a pair of spaced inking ribbon spools with the inking ribbon extending underneath the tray and across the top of the guard plate, a removable frame pivotally mounted on the tray, means on the frame for supporting a pair of spaced rollers carrying a tally roll transversely of the housing, a platen on said frame adapted to press a portion of the tally roll against the inking ribbon and the portion of the receipt card containing said embossed printing indicia when said frame is pivoted downwardly thereby printing a record on the tally roll, a second frame pivotally mounted on the tray, printing indicia supported on the second frame and adapted to press against the inking ribbon and the receipt card when the second frame is pivoted downwardly thereby printing a record on the receipt card, a manually operable cam shaft journaled in said housing and adapted when turned to pivot said first and second frames downwardly to cause the printing of a double record, means for raising the first and second frames when the shaft is returned to original position, and means for winding said tally roll and inking ribbon a predetermined amount following said printing operation.

4. A recorder for collections comprising a housing having a card receiving slot adjacent the bottom thereof, an inking ribbon guard plate received within the housing and spaced above the bottom of the housing so that a receipt card having raised printing indicia thereon may be positioned therebetween by insertion through said slot, a removable tray positioned above the guard, means for supporting an inking ribbon on the tray with the ribbon extending between the tray and the guard plate, a printing mechanism pivotally mounted on said tray adapted to be pivoted against the inking ribbon and receipt card to print a record on said card, a tally roll assembly including a frame and a tally roll mounted thereon, means for pivotally mounting the assembly above the tray for movement toward and away from the inking ribbon, said frame having means adapted to press the tally roll against the inking ribbon above the raised printing indicia on the receipt card to print a record on a tally roll mounted thereon, said guard plate having aligned openings to permit said printing action, a manually operated cam shaft for simultaneously pivoting said tally roll assembly and printing mechanism to cause the printing of a double record, and means for returning the tally roll assembly and printing mechanism to original position.

5. A recorder for collections comprising a housing having a card receiving slot adjacent the bottom thereof whereby a receipt card having raised printing indicia thereon may be inserted endwise into the bottom of the housing, a tray spaced above the bottom of the housing and arranged to overlie the receipt card inserted therein, means for supporting an inking ribbon on the tray with the ribbon extending between the tray and the card, a printing mechanism pivotally supported on the tray and adapted to be pivoted against the inking ribbon and a receipt card positioned therebeneath to print a record on said card, a frame pivotally mounted on the tray for pivoting movement toward the inking ribbon and a receipt card positioned therebeneath, means for supporting a tally roll on the frame transversely of the housing, a platen on the frame for pressing the tally roll against the inking ribbon and the raised printing indicia on a receipt card positioned therebeneath when the frame is pivoted, a manually operated cam shaft for pivoting said printing mechanism and second frame to cause substantially simultaneous printing of a record on said tally roll and on said receipt card, said cam shaft being journaled in the housing and being longitudinally removable therefrom, means for returning the printing mechanism and second frame to original position, a cover for said housing held in position on the housing by engagement with the cam shaft, and locking means mounted in the housing and having a member adapted to be moved into engagement with the shaft for preventing withdrawal of the shaft and removal of the cover.

6. In a recorder for collections, the combination comprising a housing having a receipt card receiving slot adjacent the bottom thereof, a removable tray supported in said housing above said slot so as to provide space therebetween for receiving a receipt card having printing indicia thereon, means on the tray for supporting a plurality of inking ribbon spools with the ribbon extending along the underside of said tray, a ratchet wheel adapted to drive one of said spools, a removable frame pivotally supported on the tray, means on the frame for supporting a tally roll mounted on spaced rollers transversely of the housing, a ratchet wheel adapted to drive one of said rollers, a second frame pivotally mounted on the tray having printing members thereon, manually operable means for pivoting said frames toward the tray sufficiently to cause the tally roll to be printed by the indicia of a receipt card positioned beneath the inking ribbon and to cause the printing members of the second frame to print on the receipt card, means for returning said frames to original position, and pawl means operable when the frames are pivoted away from the tray for turning said ratchet wheels a predetermined amount.

7. A recorder for collections adapted to be used with a receipt card having printing indicia embossed thereon comprising an elongated housing having a slot at one end adjacent the bottom into which said card is adapted to be inserted endwise, an inking ribbon guard plate removably supported in the housing and spaced from the bottom to permit the card to be inserted therebetween, a stop member adapted to be engaged by a stop shoulder on one edge of the card to limit the extent to which the card may be inserted into the housing, a removable tray positioned above the guard plate, means on the tray for supporting a pair of spaced inking ribbon spools with the inking ribbon extending underneath the tray and across the top of the guard plate, a removable frame pivotally mounted on the frame, means on the frame for mounting a pair of spaced rollers on which is adapted to be supported a tally roll extending transversely of the housing, a platen on said frame adapted to press the adjacent portion of the tally roll against the inking ribbon and the portion of the receipt card having said embossed printing indicia when said frame is pivoted downwardly thereby printing a record on the tally roll, a second frame pivotally mounted on the tray, a plurality of manually settable side by side printing wheels mounted on the second frame and adapted to press against an adjacent portion of the inking ribbon and the receipt card when the second frame is pivoted downwardly, thereby printing a record on the receipt card, said guard plate having cut-out portions to permit said printing actions, a manually operable cam shaft journaled in said housing and adapted when turned to pivot said first and second frames downwardly to cause the printing of the double record, means for returning the first and second frames to an upper non-printing position when the cam shaft is returned to original position, a knife blade carried by one of said frames for cutting a portion of predetermined size from the stop shoulder on the receipt card so as to permit the card to be inserted a predetermined further amount into the housing for a subsequent recording operation, and means for winding the tally roll and inking ribbon a predetermined amount when the cam shaft is returned to original position.

8. A recorder for collections comprising a generally rectangular box-like housing having a card receiving slot in one end wall and adjacent the bottom thereof to permit the endwise insertion of a receipt card into the bottom of the housing, a guard plate spaced above the bottom of the housing to provide a card receiving space therebetween, a tray supported on said guard plate, means for mounting a pair of inking ribbon spools in spaced relationship on the tray with the ribbon extending along the top of the guard plate, a frame pivotally mounted adjacent one end of the tray, a series of side by side printing wheels mounted on said frame to press against said inking ribbon and the receipt card therebeneath when the frame is pivoted, spring means normally urging said frame away from the inking ribbon, a second frame pivotally mounted on the tray, means for mounting a plurality of tally roll supports in spaced relationship on the second frame transversely of the housing, a platen on the second frame extending above the tally roll and adapted to press the tally roll against the inking ribbon and raised indicia on the receipt card when the second frame is pivoted, a cover for said housing having depending lugs extending downwardly into the housing adjacent the end walls thereof, a cam shaft journaled in said lugs and the end walls of the casing and bearing against said first and second frames adapted when turned in one direction through an angle of substantially 90 degrees to pivot said first and second frames to cause a record to be made on said tally roll and receipt card and to return the second frame to original position when the shaft is returned to original position, a handle external to the housing for turning said cam shaft through said angle, and means for winding the tally roll and inking ribbon a predetermined amount when the handle is returned to original position.

9. A recorder for collections adapted to be used with a receipt card having printing indicia embossed thereon comprising a box-like housing having a receipt card receiving slot in one end wall adjacent the bottom, a removable tray supported in said housing above the level of said slot to permit the insertion of the receipt card therebetween, means on said tray for supporting an inking ribbon along the top of the card, a printing assembly movably mounted on the tray for movement toward and from the inking ribbon and card to print thereon, an assembly for mounting a tally roll transversely of the housing movably mounted on the tray for movement toward and from the inking ribbon and card and having platen means for pressing the tally roll against the inking ribbon and the printing indicia of a card disposed therebeneath to cause the tally roll to be printed upon, a cover member for said housing having downwardly depending lugs received within the housing adjacent the end walls thereof, a longitudinally removable cam shaft for operating said tally roll assembly and printing mechanism journaled in said lugs and the end walls of the housing, said shaft having an annular shoulder and a lock on the housing having means for engaging said annular shoulder of the cam shaft for preventing longitudinal withdrawal of the cam shaft from the housing and disassembly of the recorder.

HARVEY N. BLISS.
HAROLD B. VROOM.

REFERENCES CITED

The following references are of record in the file of this patent:

UNITED STATES PATENTS

| Number | Name | Date |
|---|---|---|
| 2,019,301 | Friden | Oct. 29, 1935 |
| 2,084,098 | Long | June 15, 1937 |
| 2,087,315 | Bugg | July 20, 1937 |
| 2,233,158 | Connor | Feb. 25, 1941 |
| 2,275,653 | Rast | Mar. 10, 1942 |
| 2,281,577 | Haynes | May 5, 1942 |
| 2,342,699 | Sand | Feb. 29, 1944 |
| 2,342,898 | Sand | Feb. 29, 1944 |
| 2,346,145 | Bliss | Apr. 11, 1944 |
| 2,352,907 | Mangan | July 4, 1944 |